United States Patent
Wentz

[11] 3,719,414
[45] March 6, 1973

[54] POLARIZATION INDEPENDENT LIGHT MODULATION MEANS USING BIREFRINGENT CRYSTALS

[75] Inventor: John L. Wentz, Ellicott City, Md.

[73] Assignee: Westinghouse Electric Corporation, Pittsburgh, Pa.

[22] Filed: Aug. 28, 1970

[21] Appl. No.: 67,930

[52] U.S. Cl..............350/150, 331/94.5 Q, 350/157, 350/DIG. 2
[51] Int. Cl..................................................G02f 1/26
[58] Field of Search.350/147, 150, 157, 160, DIG. 2; 331/94.5 Q

[56] References Cited

UNITED STATES PATENTS

| | | | |
|---|---|---|---|
| 3,429,636 | 2/1969 | Wentz | 350/150 |
| 3,391,970 | 7/1968 | Sincerbox | 350/DIG. 2 |
| 3,460,885 | 8/1969 | Wentz | 350/150 |
| 3,325,646 | 6/1967 | Reichel et al | 350/150 |

OTHER PUBLICATIONS

Ammann, "Modification of Devices . . . to Allow Their Use with Arbitrarily Polarized Light" J.O.S.A. Vol. 55, No. 4 (April 1965) pp. 412–417.

Rowe, "Light Intensity Modulator" IBM Technical Disclosure Bulletin Vol. 12, No. 7 (December 1969) p. 910.

*Primary Examiner*—David Schonberg
*Assistant Examiner*—Paul R. Miller
*Attorney*—F. H. Henson, E. P. Klipfel and J. L. Wiegreffe

[57] ABSTRACT

A first optically birefringent crystal divides an incident randomly polarized light beam into two linearly polarized orthogonal components, namely, an ordinary ray and an extraordinary ray. The incident light beam is so related to the optic axis of the birefringent crystal that ordinary ray is undeviated but the exgraordinary ray is deviated by a selected amount, both of the rays emerging from the birefringent crystal parallel to each other. The amount of deviation is a function of the index of refraction and the length of the path through the crystal. The spaced rays are then directed through an electro-optical polarization modulator which electronically converts the linearly polarized components to elliptically polarized beams with the eccentricity dependent upon the magnitude of an applied electric field. For a particular magnitude of applied electric field, the polarization modulator will cause a 90° rotation of the orthogonal components. The two emerging rays are then passed through a second birefringent crystal which recombines the two rays with the intensity along the emerging axis proportional to the magnitude of the electric field applied to the polarization modulator. In the unenergized state of the polarization modulator maximum transmittance is obtained. In the energized state the transmittance varies according to $T = \sin^2 KE$ where $E$ is the magnitude of the applied electric field and $K$ is a proportionality constant. Thus, the light modulation system can be controlled electronically to make it selectively transmissive for incident light of all polarizations. The system is also described as applied to a resonant optical cavity such as a Q-switching device for randomly polarized stimulated emission of radiation devices (lasers).

1 Claim, 8 Drawing Figures

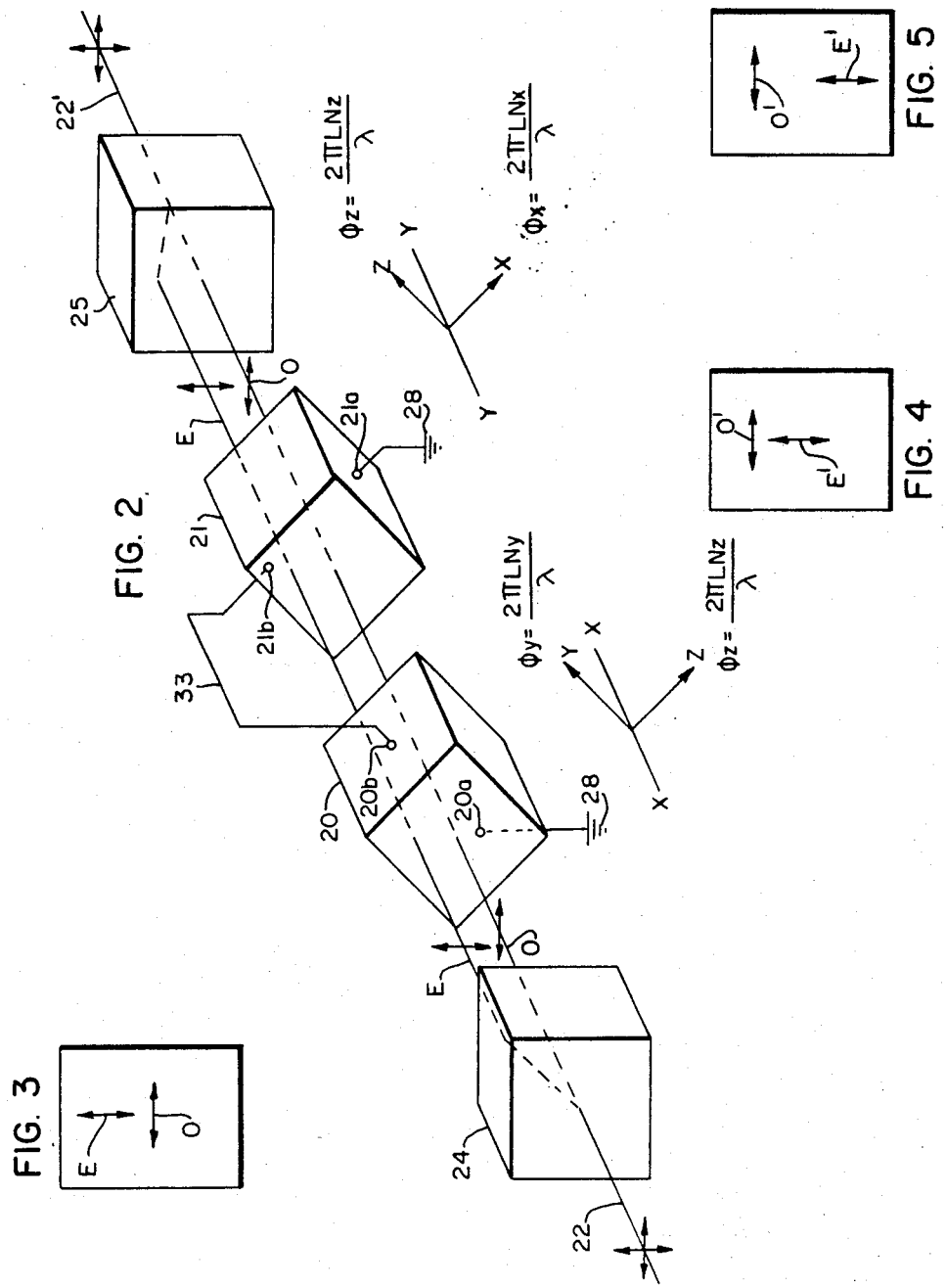

POLARIZATION INDEPENDENT LIGHT MODULATION MEANS USING BIREFRINGENT CRYSTALS

CROSS REFERENCE TO RELATED APPLICATION

In applicant's U.S. Pat. No. 3,429,636, issued Feb. 25, 1969, there is described and claimed a light modulation apparatus for electronically controlling the passage of polarized light. It is also disclosed there as applied to the resonant optical cavity of a stimulated emission of radiation device, as well as to a simple system for modulating the light intensity of a polarized light beam.

That system has gone into very wide usage because of its capability of very high frequency operation and its capability of operating at what is considered in the art as relatively low modulation voltages. In both that system and in the present one the light modulation is effected by direct polarization modulation. In the patented system the type and/or degree of polarization of the incident light must be known in order that proper adjustments of components can be made to accomplish the desired modulation.

In addition to applicant's previous patent there is a U.S. Pat. to Reichel et al. No. 3,325,646 which is perhaps the best representation of the prior art attempting to attain the objectives of the present invention. That patent describes a multiply reflected path electro-optical light modulator. Also that patent and other similar ones, such as Marcatili U.S. Pat. No. 3,259,015 dated July 5, 1966, are capable only of modulating a selected linearly polarized component of incident light. This is a serious disadvantage in these prior devices since they cannot produce complete cut-off of randomly polarized light as can the present invention.

The present invention relates generally to an improved means for modulating light energy of any and all polarizations. The primary object is to provide an improvement in the general type of light modulation means disclosed in the prior art and the aforementioned patent which eliminates the energy loss due to the necessity of using a polarizer and/or analyzer in the light path.

BRIEF DESCRIPTION OF THE DRAWINGS

FIG. 1A illustrating the light paths when the modulator is unenergized, and FIG. 1B representing the energized situation;

FIG. 2 is a schematic illustration showing the same corresponding components and supplementing FIGS. 1A and 1B;

FIG. 3 is a sectional elevation view of FIG. 1B looking in the direction of arrows at the plane III—III;

FIG. 4 is a sectional elevation view of FIG. 1B looking in the direction of the arrows at the plane IV—IV;

FIG. 5 is a sectional elevational view of FIG. 1B looking in the direction of the arrows and at the plane V—V;

Briefly, the present invention provides an improved electro-optical light modulating means which may be used as a light valve and is particularly adapted for use in modulating the Q of a Fabry-Perot cavity of a stimulated emission of radiation amplifier, or oscillator. The system is capable of effecting continuous variation in the transmission of light or of effecting pulse modulations thereof. The system is capable of operating at very high speeds in the manner of an "on-off" switch to abruptly cut off, or on, light energy reflected back and forth in the resonant optical cavity of a stimulated emission radiation amplifier or oscillator.

An illustrative embodiment of the present invention utilizes the electro-optical light modulation system described in applicant's aforesaid patent in combination with the double refracting birefringent crystal in which the crystal geometry is so selected that maximum displacement is obtained between the ordinary and the extraordinary rays to the end that the sensitivity, reliability and resolution of a system will not be sacrificed. The objective of the present invention is to provide such an electro-optical system which is capable of switching and/or modulating all of the light energy in a randomly polarized light beam and which is capable of operating at very high speed in the microwave frequency range.

Figure 1A:
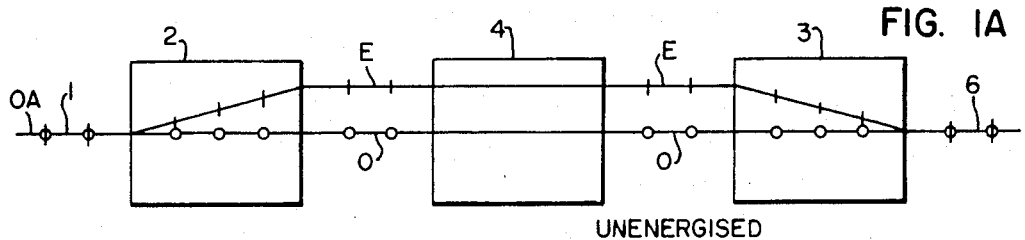
FIG. 1A and FIG. 1B are schematic illustrations of the essential components of the invention when used as a light modulating device or a light valve in a non-reflecting path.
Figure 1B:
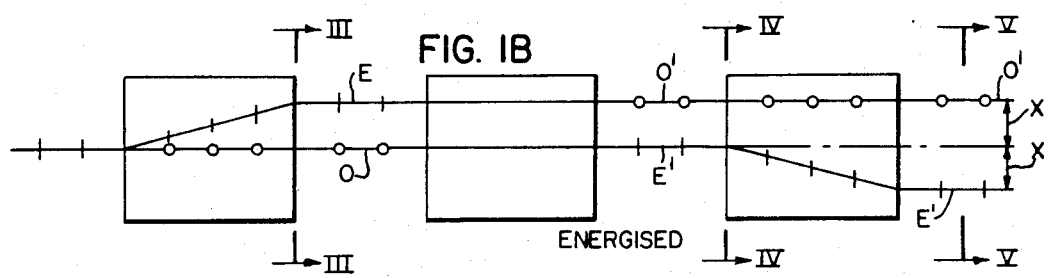

Referring to FIGS. 1A and 1B, there is shown an embodiment of the invention wherein the system is to be used where it is desired to switch or modulate an incident light beam represented at 1 being propagated from left to right. The system includes double refracting birefringent crystals 2 and 3 between which is interposed a polarization modulator 4. The polarization modulator 4 is the same as that described and claimed in applicant's patent referred to above. It will be readily apparent, of course, that any other equivalent polarization modulator could be used instead of the specific one described in applicant's patent, as far as the basic concept of the invention is concerned but, of course, such other polarization modulators may not give the results equivalent to that of the one shown.

Since polarization modulators operate on polarized light beams only it is common to think, and was heretofore thought generally, that the type of polarization modulators represented by the reference numeral 4 were not satisfactory to modulate randomly polarized light nor to serve as a light valve for all of the light energy in a beam of randomly polarized light.

The essence of the present invention resides in the association of crystals, such as crystals 2 and 3, having characteristics well known but not heretofore used in the combination disclosed herein to accomplish the end result of being able to control or modulate all of the energy of a beam of unpolarized, or randomly, polarized light.

This comes about by reason of the fact that randomly polarized, or unpolarized light may be resolved into two linearly polarized vectors vibrating in planes orthogonal to each other so that at any point in space and time, the randomly polarized light can be considered as the integrated vector sum of two orthogonally polarized light beams. The above vector analysis, although known before, has not heretofore been considered to make it possible to modulate all of the light energy in a randomly polarized light beam. The present invention takes advantage of the fact that although all birefringent crystals are double refractive, certain of them are more double refractive than others.

The present invention contemplates the utilization of such birefringent crystals for the elements 2 and 3 in which the orthogonal components of light incident upon them are spatially separated sufficiently so as to carry out the objectives of the present invention. In order to accomplish this it is necessary to choose the proper material for the crystals 2 and 3 in which the crystal geometry is optimized by carefully orienting the incident light beam 1 with respect to the optic axis of the crystals so as to provide the maximum separation. For the purpose of this invention it has been found that a biaxial crystal which gives an angle separation of approximately 9.5° for a light beam having a wavelength from 4,000 to 15,000 angstroms can provide sufficient separation within the practical limits of the crystal to carry out the objectives of this invention. The separation of the orthogonal components of a light beam are illustrated in the several figures of the drawings. FIG. 4 indicates that the spaced light vectors may be rotated preferably by 90°, when propagating through the polarization modulator 4 when it is energized as more fully explained hereinafter.

From the description so far it will be seen that for the particular orientation of crystals 2 and 3, which are also of appropriate dimensions and index of refraction for the spectrum of light energy under consideration, the ordinary ray O and the extraordinary ray E will follow paths as illustrated in FIGS. 1A and FIG. 1B for the unenergized and energized states respectively, of polarization modulator 4.

Assuming that there is no energization applied to the polarization modulator 4, the electric vectors of the extraordinary E ray and the ordinary O ray will be as shown respectively in FIG. 3. Both of the rays E and O will pass straight through the modulator 4 with the same relative position between their vectors. As the E ray enters the crystals 3 it will be deviated back to the optical axis OA as indicated in FIG. 1A, (colinear with incident ray 1) and the vector components will be combined into a single emergent beam with 6 random polarization.

Now assume that the polarization modulator 4 is energized, that is, it is in what may be termed the closed position as far as light valve action is concerned. The light paths for the O and E rays for the energized condition of the polarization modulator 4 are illustrated in FIG. 1B. As in the previous instance, the incident beam 1 will be split into the two spaced rays O and E and their light paths will be laterally spaced as indicated in FIG. 3. For a particular value of modulating voltage applied to the polarization modulator 4, the O ray will become an E' ray and the E ray will become an O' ray as illustrated in FIG. 4. Note here that the primed letters denotes components of the incident ray that are rotated by 90°. As the rays O' and E' propagate through birefringent crystal 3 further displacement of the light paths will occur as indicated in FIGS. 1B and 5 and both rays will emerge from crystal symmetrically displaced from the axis OA. Clearly then, with the O' ray and E' ray each displaced from the axis OA, by a distance X and no light is within an aperture of radius X from the axis OA.

Under these conditions with the ordinary and extraordinary rays displaced from the optical axis one obtains light valve action along the optical axis OA.

The situation for operation of the light valve just described will now be described in connection with FIGS. 6 and 7 where the present invention is applied to the Fabry-Perot cavity of a stimulated emission radiation amplifier.

When the present invention is used with a polarization modulator 4 in the Fabry-Perot cavity a convenient modulation system is provided. Any polarization modulator could be used but the preferred one capable of very high speed operation is the one described and claimed in applicant's aforesaid patent. Although the polarization modulator 4 may be exactly the same as that in the patent, the operation is slightly different here only to the extent that the spaced orthogonal components of two light rays are rotated simultaneously whereas in the patent only one light beam is involved.

Figure 6:
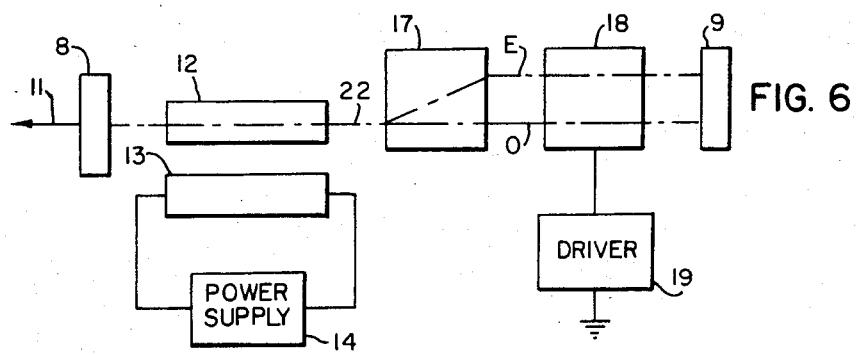
FIG. 6 is a diagrammatic illustration of an embodiment of the invention applied as a Q-switch for a Fabry-Perot cavity of a stimulated emission of radiation amplifier or oscillator.

Referring to FIG. 6, a stimulated emission of radiation system using the present invention includes two mirrors 8 and 9, forming a Fabry-Perot resonant optical cavity one of which mirrors is totally reflecting and the other one, for example, mirror 8 may be partially reflecting to provide means for coupling light out of the cavity in the form of a beam indicated at 11 of enhanced coherency. The system also includes a body of negative temperature medium, such as the laser rod 12, which may be optically pumped by the output from a suitable flash tube 13 energized by a suitable power supply 14 in the manner well understood in the art. The polarization modulator 18 is the same as the modulator 4 of FIG. 1 and is associated with a birefringent crystal 17 having the same characteristics as the crystal 2, previously mentioned in connection with FIG. 1. The modulation of the output light beam 11 is controlled by the output from a suitable electronic driver 19 in the manner well understood in the art, and particularly set forth in the aforesaid patent of applicant.

The modulator 18, per se, is illustrated in more detail in FIG. 2 and one embodiment comprises a pair of electro-optical uniaxial crystals 20 and 21 in which the electro-optical effect is the result of induced birefringence which occurs when an electric field is applied to the crystals along a particular axis. As an example of this particular type of crystal which may be used is the dehydrogen phosphate type of crystals. This type has been found to be very satisfactory for operation in this device. The electro-optical effect in these crystals occurs as a result of anisotropy in the crystal indices of refraction along the principal crystal axes when the crystals are subjected to an electric field. The characteristics of these crystals can best be described in terms of the Fresnel index ellipsoid which has axes proportional to the principal indices of refraction in the crystal. Plane polarized light incident upon an electro-optic crystal such as KDP, will produce double refraction and phase retardation between the orthogonal components of the incident light vibrating along the principal optical axis in the crystal. In uniaxial crystals, two of indices of refraction in the index ellipsoid are equal. Therefore, no retardation birefringence occurs for light propagating perpendicular to the plane of equal indices. This propagation direction determines the optic axis of the crystal. Crystals in which the principal indices are unequal are termed biaxial, that is, they have two optic axes. Electro-optic crystals, which are normally uniaxial become biaxial when the electric field is applied parallel to the Z-axis. In uniaxial electro-optic crystals, the indices of refraction for light vibrating parallel to the X and Y axis is altered by applied voltages along the Z-axis and under this condition the X and Y indices are no longer equal.

In the illustration of FIG. 2 the incident light beam 22 may correspond to the beam 1 in FIG. 1. Further relating FIG. 2 to FIGS. 1 and 6, a double refracting crystal 24 corresponds to the crystal 2 of FIG. 1 and crystal 17 of FIG. 6. The electro-optical crystals 20 and 21 in FIG. 2 corresponds to the device 18 in FIG. 6. When the unpolarized light beam 22 is incident upon the crystal 24 the double refraction will take place and two light paths, one the ordinary ray O and the other the extraordinary ray E, will be generated as previously described in connection with FIG. 1. For purposes of illustration let us assume that the electric vectors of the O and E rays are as indicated in FIG. 3. Also there should be a remark here that the incident light beam 22 may represent the light beam proceeding to the right emitted from the laser rod 12.

As the light beam 22 proceeds through the crystal 17 in FIG. 6 (which corresponds to the crystal 24 in FIG. 2) the two rays O and E will be generated and if the polarization modulator 18 is not energized, that is zero potential across the terminal 33 and ground 29 of FIG. 2. The two components would then be reflected from the mirror 9 and would be returned to the right hand side of the crystal 17. Then as the reflected light beams proceed to the left in FIG. 7, the O and E rays will be refracted in a manner similar to but exactly opposite to the manner in which the O and E rays are refracted in the crystal 3 when the rays were proceeding from left to right as previously discussed in connection with FIG. 1.

From the previous discussion of FIG. 1 it follows logically that the O and E rays will be doubly refracted in the opposite sense in which they were doubly refracted in FIG. 1 when the rays were proceeding from left to right. Accordingly, referring to FIG. 7 it will be seen that the reflected E ray proceeding from the polarization modulator 18 toward the left hand side will be refracted so that it emerges from the left hand side of crystal 17 at the optical axis and combines with the O ray and the combined rays will proceed to the left through the laser rod 12 and will be reflected back from the mirror 8.

Figure 7:
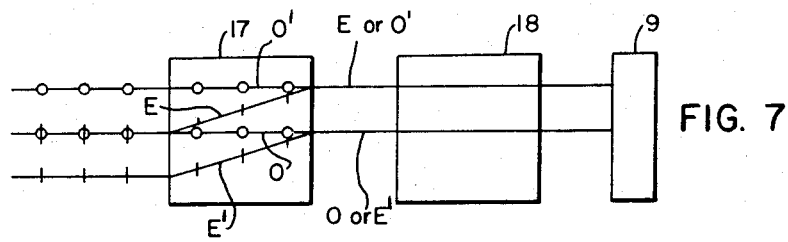
FIG. 7 is a diagram showing the paths of incident and reflected light rays for facilitating in the embodiment of the invention shown in FIG. 6.

Now consider beam 22 proceeding from the laser rod 12 from left to right in FIG. 6, when polarization modulator 18 is unenergized and the O and E rays will be deviated as shown in FIGS. 3 and 7. These rays will proceed to the right unaffected by the polarization modulator 18 to the mirror 9 where they will be reflected back through the polarization modulator 18 and the crystal 17 and will be recombined and directed along the laser rod axis. It will continue to pass through the laser rod 12 and will be reflected back by the mirror and this will be repeated while the polarization modulator 18 is unenergized. In this state, optical feedback is allowed and laser action will occur.

Now assume that the polarization modulator 18 is energized. As the light beam 22 proceeds from the laser rod 12 toward the right and passes through the crystal 17, the O and E rays will be generated again as in FIG. 3. The energization of the modulator 18 causes the O and E rays to revert to an O' and E' ray as shown in FIG. 7, after a round trip pass through polarization modulator 18. As the rays O and E continue to the left through the crystal 17 they will retain their same polarization that they had when they left the polarization modulator 18 and the crystal 17 will refract each of the two rays, which are indicated as O' and E' in FIGS. 4 and 7. It will be apparent from these other two figures that the E' ray is now in the same position as the original incident O ray and the O' ray is in the same position as the original E ray. During propagation through crystal 17, the O' and E' rays will be further displaced from one another and symmetrically displaced from the axis of the laser rod 12 in FIG. 6 as the rays emerge from the left hand side of crystal 17. In this state optical feedback is prevented from passing through the laser rod 12 and laser action will not occur.

For a more complete description of the manner in which the polarization modulator 18 operates on the spaced linearly polarized O and E rays, reference is now made to FIG. 2.

The polarization modulator 18 comprises a pair of suitable electro-optical crystals which are uniaxial and become biaxial when subjected to an electric field. The preferred type of crystal is the dehydrogen posphate type such as KDP or ADP. For those readers which are not entirely familiar with the type of crystal it might be said that the uniaxial crystals normally have one optic axis along which no phase retardation takes place when the light passes parallel to the axis in the absence of an applied electric field. The electro-optic effect in crystals of this type is the result of induced birefringence which occurs when the electric field is applied to the crystal along a particular axis. Birefringency is a consequence of anisotropy in the crystal indices of refraction along the principal crystal axis. Electro-optic crystals are best described in terms of the Fresnel index ellipsoid which have axes proportional to the principal indices of refraction in the crystal. Plane polarized light incident upon a birefringent crystal will experience double refraction and phase retardation between the orthogonal components of the incident light vibrating along the principal optical axis in the crystal. In uniaxial crystals, two of the indices of refraction in the ellipsoid are equal. Therefore, no birefringence occurs for light propagating perpendicular to the plane of the equal indices. This propagation direction determines the optic axis of the crystal. Crystals in which the principal indices are unequal are biaxial, that is they have two optic axes. An electric field applied parallel to the Z-axis of a uniaxial electro-optic crystal causes the indices of refraction for light vibrating parallel to the respective X and Y axis to be altered so that the X and Y indices are no longer equal.

It will be noted from FIG. 2 that the X axis of crystal 20 is axially aligned with the Y axis of crystal 21. The two crystal system has all the properties of the optical axis in conventional electro-optic shutters employing the Pockels effect. By the application of the proper dimensioning of the crystals and by applying the appropriate electric field, dependent upon the crystal dimensions, it is possible to produce $\pi$ radians phase difference between the emerging components of linearly polarized input light. Under this condition, the resultant output polarization is rotated 90° with respect to the input polarization. For use of the invention simply as a light modulator or a light shutter as in FIG. 1, an appropriate analyzer would be associated with the combined light beams emerging from the crystals 20 and 21 to effect light modulation. On the other hand, when the light modulator is used in association with the optical cavity of a laser as in FIG. 6, the electro-optical modulator is able to control the amount of light which is regeneratively coupled back into the laser medium.

Preferably, although not necessarily, the elongated crystals 20 and 21 have a square cross section. They may have a rectangular cross section as long as the dimensions along the respective Z-axes are the same. The physical axis of each crystal should lie in, or be perpendicular to, the 110 plane of crystal and also be parallel to the X–Y plane. To complete the electro-optical light modulating device, it is necessary to provide a source of electrical potential connected to the longitudinal sides of the crystals so that their respective electric fields are parallel to the Z-axis. In the illustrated embodiment in FIG. 2, this potential may be applied across the terminals 20a and 20b of the crystal 20 and the terminals 21a and 21b of the crystal 21. Terminals 20b and 21b are common to input lead 33 and a suitable potential is applied between this lead 33 and ground 28 to which the terminals 20a and 21a of the two respective crystals are connected.

If a comparison is made between this application and applicant's patent it will be noted that in the patent the system is used with a light beam which is linearly polarized, the plane of polarization being represented by a vector at 45° with respect to the Y and Z axis of the first crystal and X and Z axis of the second crystal.

The significant difference between the present invention and the patent is that the incident light beam, indicated at 1 in FIG. 1 and at 22 in FIG. 6 in the present invention need not be polarized. This is a very great advance forward in the art because in the patented construction with any source of unpolarized light it is necessary to throw away 50 percent thereof. In the present instance, by adding the birefringent crystal 2 of FIG. 1, or the crystal 17 of FIG. 6, any incoming light can be modulated electrically. Should the incoming incident beam be linearly polarized and be strictly parallel to one of the axis as in FIGS. 1 and 6, a single ray will be transmitted through the system and modulation can be effected as in the patented construction. On the other hand, when the incident light beam is randomly polarized the crystal 2 in FIG. 1 and the crystal 17 in FIG. 6 resolves the incoming beam into two separate rays with the electric vector of two rays being orthogonal to each other as indicated in FIG. 3. We now have two linearly polarized components of light each of which is acted upon separately by the polarization modulator 4 or 18.

A brief review of the theory of the operation of the system described as outlined below may be helpful. Let $N_x$, $N_y$ and $N_z$ be the principal indices of refraction for the X, Y and Z crystal axes and let $L$ be the length of the crystals along the light path. Also let $d$ represent the dimension of the crystals transverse to the longitudinal axis. Since the crystals have a square cross section, the dimension $d$ will always be parallel to the Z axes of the respective crystals. Let $\lambda$ be the wavelength of the incident radiation represented by the light beam 22.

In passing through the crystal 20, along the X axis of the crystal, the Y component of the polarization undergoes a phase change of $$\phi_y = (2\pi L N_y/\lambda) \quad (1)$$

radians and the component parallel to the Z axis undergoes a phase change of $$\phi_z = (2\pi L N_z/\lambda) \quad (2)$$

radians. The phase change resulting from the air gap between the two crystals 20 and 21 is the same for each component and will be expressed as a constant, $\alpha$. In passing through crystal 21 along the Y axis of the latter, the X component of the polarization undergoes a phase change of $$\phi_x = (2\pi L N_x/\lambda) \quad (3)$$

radians and the component parallel to the Z axis undergoes a phase change of $$\phi_z = (2\pi L N_z/\lambda) \quad (4)$$

radians. The total phase change for the X and Y components in passing through both crystals is $$\Theta_x = \phi_x + \phi_z + \alpha = \frac{2\pi L}{\lambda}(N_x + N_z) + \alpha \quad (5)$$

and $$\Theta_y = \phi_y + \phi_z + \alpha = \frac{2\pi L}{\lambda}(N_y + N_z) + \alpha \quad (6)$$

respectively. The phase difference between the two components is $$\Theta = \Theta_x - \Theta_y = \frac{2\pi L}{\lambda}[(N_x + N_z) - (N_y + N_z)] \quad (7)$$

This then becomes:

$$\Delta\Theta = \frac{2\pi L}{\lambda}[N_x - N_y] \quad (8)$$

If no electric field is applied to the Z axes of the respective crystals, the indices of refraction $N_x$ and $N_y$ are equal, that is $N_x = N_y = N_o$. The phase difference between the emerging perpendicular components of each linearly polarized input ray, is then zero, that is, $$(\Delta\Theta = 0) \quad (9)$$

The original polarization of each incident light ray 0 and E is preserved.

When an electric field is applied along the Z axis of the two crystals, that is, when electric potential is applied to the electrodes 20a and 20b of crystal 20 and 21a and 21b of crystal 21 the index of refraction $N_x$ and the index of refraction $N_y$ of the two crystals are no longer equal. But significantly, the index of refraction $N_z$ along the Z axis of the crystal remains unchanged. When the electric field is applied to these crystals, one of the indices increases while the other decreases. This may be represented as $$N_x = N_o \pm \Delta N \quad (10)$$

and $$N_y = N_o \mp \Delta N \quad (11)$$

where $\Delta N$ is the change in index of refraction brought about by application of the electric field. It has been determined by others that $$\Delta N = (r_{63} V_z N_o^3 / 2d) \quad (12)$$

Substituting the value of $N_x$ and $N_y$ in Equation (8) gives $$\Delta\Theta = (2\pi L r_{63} V_z N_o / \lambda\, d) \quad (13)$$

where $r_{63}$ is an electro-optic constant and where $V_z$ is a voltage applied along the Z axis.

By the application of the proper voltage to the Z axes of the two respective crystals 20 and 21 and the voltage being properly related to the longitudinal and transverse dimensions of the crystals, it is possible to cause the linear components of the input light ray emerging from the right-hand end of the crystal 21 to have a $\pi$ radians phase difference, that is, $$\Delta\Theta = \pi \quad (14)$$

In this latter condition, the incident ray 1 or 22 will have its plane of polarization rotated 90° when it emerges from the right-hand end of crystal 21.

The required voltage to cause a 90° rotation of the input polarization ray may be determined by substituting the values $N_x = N_o + \Delta N$ and $N_y = N_o - \Delta N$ in Equations (10) and (11), respectively, and the value of $\Delta\Theta = \pi$ in Equation (14) into Equation (8). Solving this, gives $$V_z = \lambda\, d / (2 r_{63} N_o^3 L) \quad (15)$$

Since the factor $$\lambda / (2 r_{63} N_o^3)$$

is recognized as the half-wave voltage, that is, the voltage necessary to produce a $\pi$ radians phase displacement between the emergent components of the incident ray when an electric field is applied parallel to the Z axis and when the light is also parallel to the Z axis. Therefore, a reduction in the half-wave voltage by a factor of $L/d$ is accomplished by the present invention over the system in which the light rays are propagated along the Z axis. Since it is possible to produce a polarization rotation between the incident and emergent rays of 90° by appropriate voltages, a complete light shutter effect can be produced. It is obvious that modulation of light in a continuous manner from a maximum to a minimum is possible.

A significant feature of the above discussion is to show that the modulating or light shutter action can be accomplished in a system shown in FIG. 1 in which the light is directed along either the X- or Y-axis instead of along the Z axis where the prior art teaches that it should be directed in order to accomplish a result similar to that of this invention although in a more inefficient manner. The real significance of this is that the electrodes on the crystals 20 and 21 to which the modulating voltages are applied are on the longitudinally extending sides of the crystals, that is, the electric field is applied transversely to the light path, where there is no interference with the light beam 1 and 22 so that a minimum of the optical energy is absorbed in the transmission path.

In an embodiment of the present invention reduced to practice, the crystals 20 and 21 were 1 inch × ¼ inch × ¼ inch in size and optically finished to laser rod tolerances. The calculated voltage necessary to achieve a 90° rotation of a ruby laser beam ($\lambda = 6{,}943$ A.) is 1,200 volts and this agreed very well with the experimental value. Under normal Q switching conditions, the crystals were biased at approximately 1,100 volts, maintaining the optical shutter in the closed condition. A drawing pulse lowered the bias voltage to approximately 300 volts which was sufficient, for all practical purposes, to open the optical shutter and permit laser action.

I claim:

1. Light modulation apparatus for light having its electric vectors at any orientation comprising a birefringent element for receiving an incident light beam and resolving said beam into two orthogonal components in spaced parallel paths, first and second birefringent electrooptical crystals having substantially the same index of refraction, arranged in light transmitting relationship, with the respective optic axes of said crystals being effectively optically perpendicular to each other and to the optical axis determined by the colinear alignment of one of the principal axes of each of said crystals, said crystals having the same length along said optical axis and being subjected to the same external environmental conditions, means for supplying a modulation signal voltage to said crystals with the electric fields parallel to the respective Z-axes of said crystals and means for reflecting said orthogonal components of said incident light beam back through said crystals.

* * * * *